(12) United States Patent
Lin

(10) Patent No.: US 10,341,476 B2
(45) Date of Patent: Jul. 2, 2019

(54) MOBILE TERMINAL

(71) Applicant: GUANGDONG OPPO MOBILE TELECOMMUNICATIONS CORP., LTD., Dongguan, Guangdong (CN)

(72) Inventor: Yugui Lin, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/708,878

(22) Filed: Sep. 19, 2017

(65) Prior Publication Data

US 2018/0007182 A1    Jan. 4, 2018

Related U.S. Application Data

(63) Continuation of application No. PCT/CN2016/081500, filed on May 10, 2016.

(30) Foreign Application Priority Data

Jul. 13, 2015    (CN) .......................... 2015 1 0408467

(51) Int. Cl.
  *H04M 1/02*    (2006.01)
  *G06F 1/16*    (2006.01)
  (Continued)

(52) U.S. Cl.
  CPC ........ *H04M 1/0268* (2013.01); *G06F 1/1641* (2013.01); *G06F 1/1652* (2013.01);
  (Continued)

(58) Field of Classification Search
  CPC ............. H04M 1/0268; H04M 1/0264; H04M 1/0235; H04M 1/0272; H04M 1/0237;
  (Continued)

(56) References Cited

U.S. PATENT DOCUMENTS 6,667,888 B1    12/2003   Chang et al.
8,478,366 B2 *  7/2013    Shin .................... H04M 1/0241
                                               353/119

(Continued)

FOREIGN PATENT DOCUMENTS

CN      101729661 A    6/2010
CN      102566816 A    7/2012
(Continued)

OTHER PUBLICATIONS

International Search Report (ISR) and Written Opinion (WO) dated Jul. 21, 2016 for International Application No. PCT/CN2016/081500.
(Continued)

*Primary Examiner* — Eugene Yun
(74) *Attorney, Agent, or Firm* — Ladas & Parry LLP

(57) ABSTRACT

A mobile terminal includes a first body including a first surface; a second body including a second surface; a third body including a third surface; and a flexible screen coupled to the first surface of the first body, the second face of the second body and the third surface of the third body and including a first end and a second end, wherein the first end of the flexible screen is movable relative to the second surface of the second body, and the second end of the flexible screen is movable relative to the third surface of the third body.

11 Claims, 3 Drawing Sheets

(51) Int. Cl.
  *G03B 17/54* (2006.01)
  *G03B 17/04* (2006.01)
(52) U.S. Cl.
  CPC .......... *G06F 1/1677* (2013.01); *G06F 1/1686* (2013.01); *H04M 1/0237* (2013.01); *H04M 1/0247* (2013.01); *G03B 17/04* (2013.01); *G03B 17/54* (2013.01); *H04M 1/0214* (2013.01); *H04M 1/0235* (2013.01); *H04M 1/0264* (2013.01); *H04M 1/0272* (2013.01)
(58) Field of Classification Search
  CPC . H04M 1/0247; H04M 1/0214; G06F 1/1686; G06F 1/1641; G06F 1/1677; G06F 1/1652; G03B 17/04; G03B 17/54
  USPC .............................................. 455/566, 575.3
  See application file for complete search history.

(56) References Cited

U.S. PATENT DOCUMENTS

| | | | |
|---|---|---|---|
| 8,787,016 B2* | 7/2014 | Rothkopf | H04M 1/0216 361/679.55 |
| 9,047,055 B2* | 6/2015 | Song | E05D 3/14 |
| 2005/0140811 A1 | 6/2005 | Yoo et al. | |
| 2007/0097248 A1 | 5/2007 | Yoo et al. | |
| 2007/0099656 A1 | 5/2007 | Yoo et al. | |
| 2007/0129099 A1 | 6/2007 | Lee | |
| 2011/0095975 A1 | 4/2011 | Hwang et al. | |
| 2011/0241998 A1* | 10/2011 | McKinney | G06F 1/1616 345/168 |
| 2012/0212433 A1 | 8/2012 | Lee et al. | |
| 2012/0329528 A1 | 12/2012 | Song | |
| 2014/0187227 A1 | 7/2014 | Song | |
| 2014/0285476 A1 | 9/2014 | Cho et al. | |
| 2015/0119112 A1 | 4/2015 | Hwang et al. | |
| 2015/0177789 A1 | 6/2015 | Jinbo | |
| 2016/0187930 A1 | 6/2016 | Jinbo | |

FOREIGN PATENT DOCUMENTS

| | | |
|---|---|---|
| CN | 203289507 U | 11/2013 |
| CN | 103941816 A | 7/2014 |
| CN | 204102028 U | 1/2015 |
| CN | 104750187 A | 7/2015 |
| CN | 104980544 A | 10/2015 |
| CN | 204795174 U | 11/2015 |
| EP | 1 549 029 A1 | 6/2005 |
| EP | 2 315 186 A2 | 4/2011 |
| EP | 2 538 639 A2 | 12/2012 |
| WO | 2006/067640 A2 | 6/2006 |

OTHER PUBLICATIONS

Notification to Grant Patent dated Sep. 14, 2016 for Chinese Application No. 201510408467.4 with Search Report.
espacenet English abstract of CN 104980544 A.
espacenet English abstract of CN 204795174 U.
espacenet English abstract of CN 101729661 A.
espacenet English abstract of CN 204102028 U.
espacenet English abstract of CN 104750187 A.
espacenet English abstract of CN 103941816 A.
espacenet English abstract of CN 203289507 U.
espacenet English abstract of CN 102566816 A.
Supplementary European Search Report (SESR) dated Jul. 16, 2018 for Application No. EP 16 82 3707.

* cited by examiner

MOBILE TERMINAL

This application is a continuation of International Application No. PCT/CN2016/081500, filed on May 10, 2016, which claims priority to Chinese Patent Application No. 201510408467.4, filed on Jul. 13, 2015, both of which are hereby incorporated by reference in their entireties.

TECHNICAL FIELD

The present disclosure relates to the technical field of mobile devices.

BACKGROUND

With the continuous development of science and technology, appearances and functions of portable electronic products such as a mobile terminal change with each passing day. As demands for functions of the mobile terminal increases, a limited operating interface of a small portable terminal such as the mobile phone is not sufficient to satisfy the demands.

DETAILED DESCRIPTION OF THE PRESENT DISCLOSURE

The technical solutions of the present disclosure are further illustrated below in combination with accompanying drawings and specific implementation manners.

Figure 1:
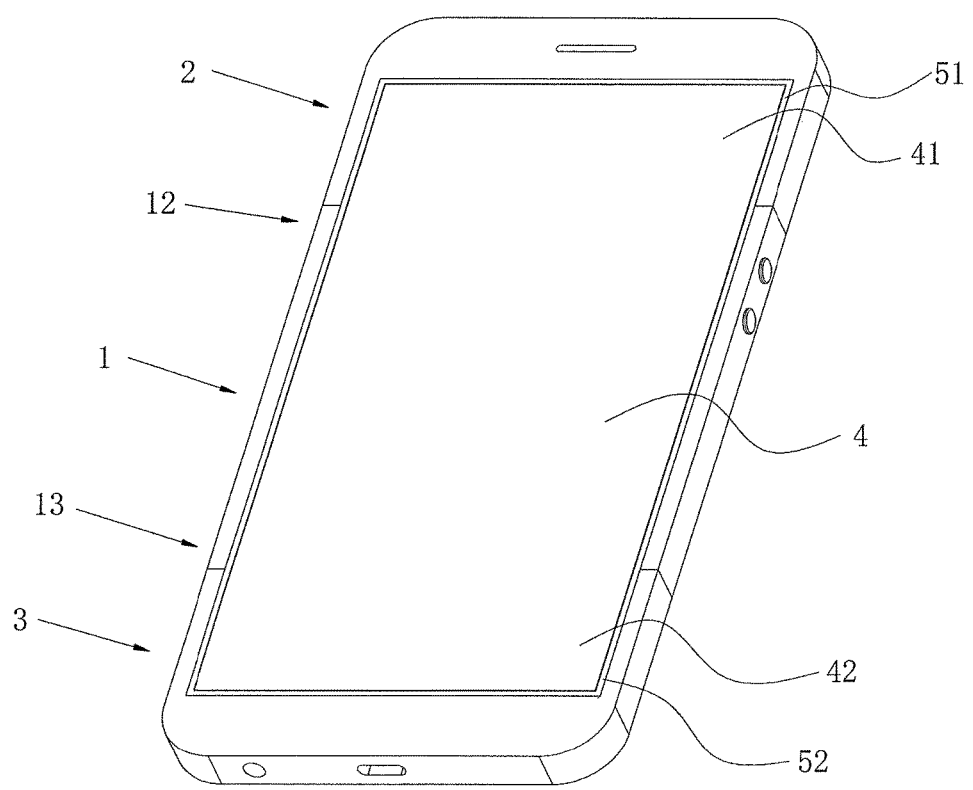
FIG. 1 is an isometric view of a mobile terminal in a first configuration in an embodiment of the present disclosure.

FIG. 1 illustrates a mobile terminal of an embodiment of the present disclosure. The mobile terminal can include a first body 1, a second body 2, a third body 3, and a flexible screen 4 supported by the first body 1, the second body 2 and the third body 3.

The first body 1 has a first end 12 and a second end 13 opposite to the first end 12. The second body is disposed at the first end 12 and the third body is disposed at the second body 13.

Figure 3:
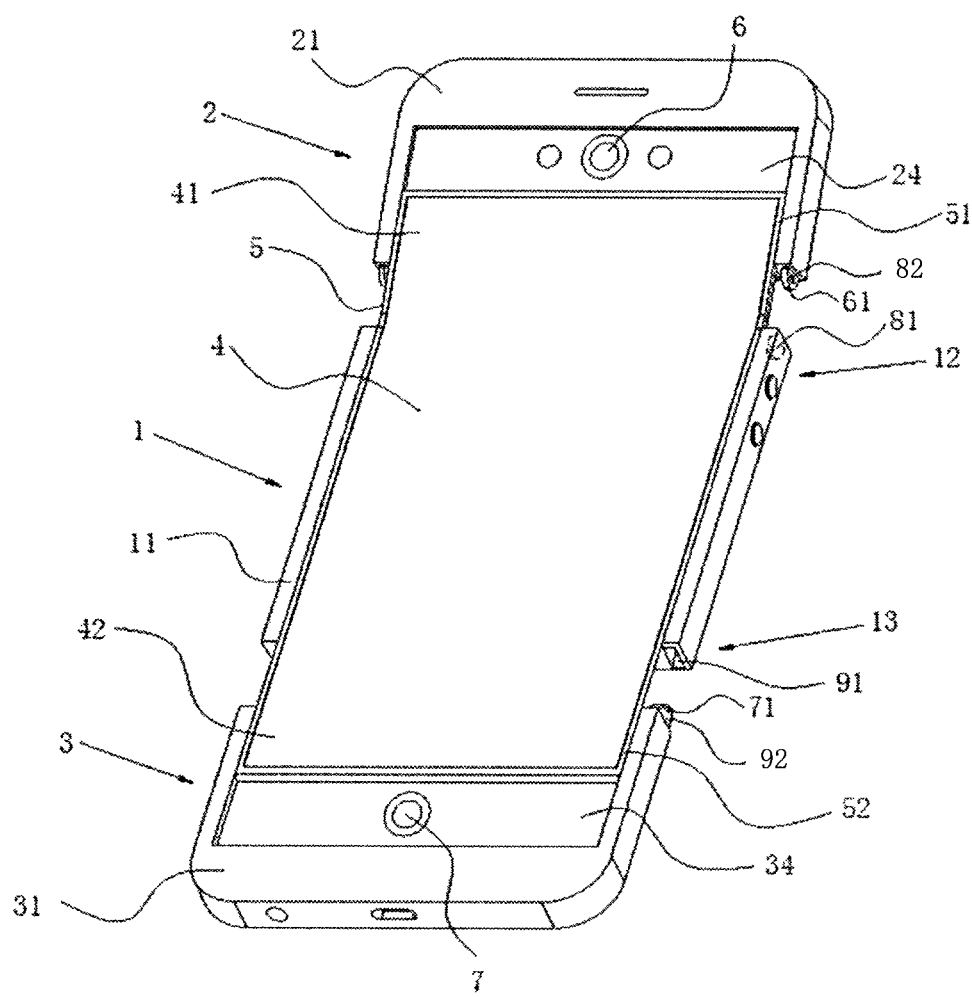
FIG. 3 is an isometric view of the mobile terminal in FIG. 1, but in a second configuration.

FIG. 3 illustrates that the first body 1 has a first surface 11, the second body has a second surface 21 and the third body 3 has a third surface 31.

The flexible screen 4 is coupled to the first surface 11, the second surface 21 and the third body surface 31.

Alternatively, the flexible screen 4 has a first end 41 thereof movably coupled to the second surface 21. The flexible screen 4 has a second end 42 thereof movably coupled to the third surface 31. The first end 41 of the flexible screen 4 is opposite to the second end 42 of the flexible screen 4.

Alternatively, the second body 2 is selectively coupled to or separated from the first end 12 of the first body 1.

Alternatively, the first end 12 of the first body 1 and the second body 2 can be coupled to each other by first coupling components.

Alternatively, the first coupling components include a first coupling part 91 and a second coupling part 92. The first coupling part 91 is disposed at the first end 12 of the first body 1 and the second coupling part 92 is disposed at the second body 2. The first coupling part 91 and the second coupling part 92 mate with each other and are selectively coupled to or separated from each other.

For example, the first coupling part 91 is a buckle and the second coupling part 92 is a slot.

Or, the first coupling part 91 is a slot and the second coupling part 92 is a buckle.

Alternatively, the third body 3 is selectively coupled to or separated from the second end 13 of the first body 1.

Alternatively, the second end 13 of the first body 1 and the third body 3 can be coupled to each other by second coupling components.

Alternatively, the second coupling components include a third coupling part 91 and a forth coupling part 92. The third coupling part 91 is disposed at the second end 13 of the first body 1, and the forth coupling part 92 is disposed at the third body 3. The third coupling part 91 and the forth coupling part 92 mate with each other and are selectively coupled to or separated from each other.

For example, the third coupling part 91 is a buckle and the forth coupling part 92 is a slot.

Or, the third coupling part 91 is a slot and the forth coupling part 92 is a buckle.

Alternatively, the second body 2 is rotatable relative to the first body 1.

Alternatively, the third body 3 is rotatable relative to the first body 1.

Alternatively, by rotating at least one of the second body 2 and the third body 3 relative to the first body 1, the mobile terminal can be transformational between a first configuration and a second configuration.

Figure 2:
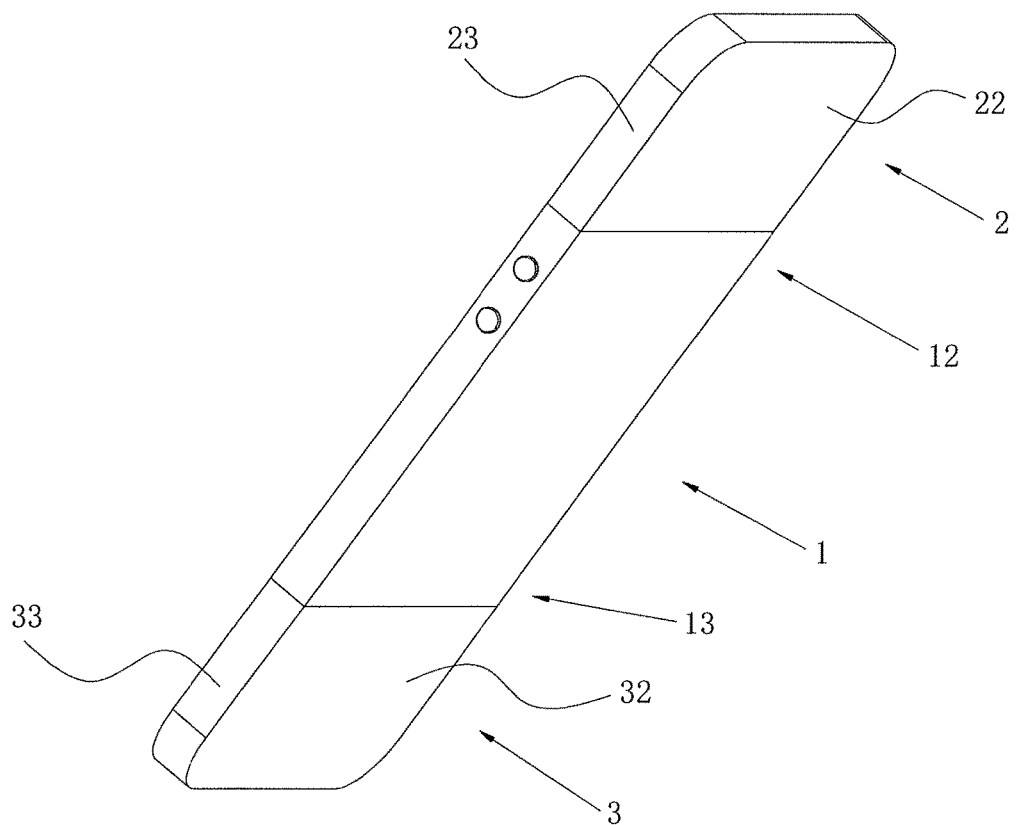
FIG. 2 is an isometric view from another point of view of the mobile terminal in FIG. 1.

FIGS. 1 and 2 illustrate the mobile terminal in the first configuration.

In the first configuration, the first body 1, the second body 2 and the third body 3 can be in alignment with each other.

In the first configuration, the whole flexible screen 4 can be located in a single plane.

FIG. 3 illustrates the mobile terminal in the second configuration.

In the second configuration, at least one of the second body 2 and the third body 3 can be angled relative to the first body 1 or located at different sides of the first body 1.

In the second configuration, the flexible screen 4 can be located in different planes.

Alternatively, the mobile terminal can further include a camera component 6 mounted to the second body 2.

Alternatively, the camera component 6 is mounted to the second surface 21 of the second body 2.

Specifically, a first cover portion 24 overlapped with the flexible screen 4 selectively is mounted to the second surface 21 of the second body 2, and the camera component 6 is mounted to the first cover portion 24 of the second surface 21 and selectively hidden between the second body 2 and the flexible screen 4.

Alternatively, as illustrated in FIG. 2, the second body 2 further has a forth surface 22 opposite to the second surface 2. The camera component 6 can be mounted to the forth surface 22.

Alternatively, as illustrated in FIG. 2, a first frame 23 is disposed between the second surface 21 and the forth surface 22. The camera component 6 can be mounted to the first frame 23.

Alternatively, the mobile terminal can further include a micro projection module 7 mounted to the third body 3.

Alternatively, the micro projection module 7 is mounted to the third surface 31 of the third body 3.

Specifically, a second cover portion 34 overlapped with the flexible screen 4 selectively is mounted to the third surface 31 of the third body 3, wherein the micro projection module 7 is mounted to the second cover portion 34 of the third surface 31 and selectively hidden between the third body 3 and the flexible screen 4.

To be noted, "selectively hidden" refers to be concealed or exposed. Specifically, "selectively hidden" refers to that the camera component 6 and the micro projection module 7 are concealed behind back side of the flexible screen 4 when they are not used, and the camera component 6 and the micro projection module 7 are exposed from one side of the flexible screen 4 when they are used.

Alternatively, as illustrated in FIG. 2, the third body 3 further has a fifth surface 32 opposite to the third surface 31. The micro projection module 7 can be mounted to the fifth surface 32.

Alternatively, as illustrated in FIG. 2, a second frame 33 is disposed between the third surface 31 and the fifth surface 32. The micro projection module 7 can be mounted to the second frame 33.

In the illustrated embodiments, by rotating at least one of the second body 2 and the third body 3 relative to the first body 1, the mobile terminal can be transformational between the first configuration and the second configuration. Thus, the camera component 6 can be orientated to different directions or be located in different planes, and the micro projection module 7 can be orientated to different directions or be located in different planes.

Alternatively, in the first configuration, the camera component 6 and the micro projection module 7 are located in a same plane, in the second configuration, the camera component 6 and the micro projection module 7 are located in different planes.

Alternatively, in the first configuration, the camera component 6 and the micro projection module 7 may face a same direction, and in the second configuration, the camera component 6 and the micro projection module 7 may face different directions.

In the illustrated embodiments, the camera component 6 is mounted to the second body 2 which can be rotated individually relative to the first body 1, and the micro projection module 7 is mounted to the third body 3 which can be rotated individually relative to the first body 1, so that angle adjustment of the camera component 6 and the micro projection module 7 can be implemented individually, enabling the mobile terminal to meet requirements of simultaneously outputting projection and inputting photographing.

In addition, the camera component 6 is mounted to the second body 2 which is rotatable, so that multi-angle adjustment of camera component 6 can be realized and flexibility of the camera component 6 can be improved, so as to meet requirements of a user for photographing from different angles.

And, the micro projection module 7 is mounted to the third body 3 which is rotatable, so that the multi-angle adjustment of micro projection module 7 can be realized and flexibility of the micro projection module 7 can be improved, so as to meet requirements of a user for projection from different angles.

Further, a mobile terminal structure with both ends being bendable enables the first body 1, the second body 2 and the third body 3 to serve as a fixed support when the camera component 6 and the micro projection module 7 are used, which avoids inconvenience of providing fixed support additionally and improves use convenience of the camera component 6 and the micro projection module 7.

Alternatively, the camera component 6 includes a lens and a flashlight disposed at one side of the lens.

Alternatively, the first body 1, the second body 2 and the third body 3 are shaped like a rectangular solid, and the first surface 11, the second surface 21 and the third surface 31 are in a rectangular shape. An area of the first surface 11 is greater than that of the second surface 21, and an area of the first surface 11 is greater than that of the third surface 31.

Alternatively, signal between the first body 1 and the second body 2 is transmitted through a flat cable, and signal between the first body 1 and the third body 3 is transmitted through a flat cable.

Alternatively, the state of the camera component 6 can be changed when the intercoupled first body 1 and second body 2 are separated from each other, or when the first body 1 and second body 2 in a separated state are coupled to each other.

Taking that the camera component 6 is disposed at the first cover portion 24 as an example, when the first body 1 and the second body 2 are coupled to each other, the first cover portion 24 is overlapped with the flexible screen 4 and hidden behind back side of the flexible screen 4. In this case, the camera component 6 is hidden behind back side of the flexible screen 4 and the camera component 6 is in a standby state. And, when the intercoupled first body 1 and second body 2 are separated from each other, the first cover portion 24 is exposed from one side of the flexible screen 4. In this case, the camera component 6 is exposed from one side of the flexible screen 4 and the camera component 6 is in an operation state.

Alternatively, the state of the micro projection module 7 can be changed when the intercoupled first body 1 and third body 3 are separated from each other, or when the first body 1 and third body 3 in a separated state are coupled to each other.

Taking that the micro projection module 7 is disposed at the second cover portion 34 as an example, when the first body 1 and the third body 3 are coupled to each other, the second cover portion 34 is overlapped with the flexible screen 4 and hidden behind back side of the flexible screen 4. In this case, the micro projection module 7 is hidden behind back side of the flexible screen 4 and the micro projection module 7 is in a standby state. When the intercoupled first body 1 and third body 3 are separated from each other, the second cover portion 34 is exposed from one side of the flexible screen 4. In this case, the micro projection module 7 is exposed from one side of the flexible screen 4 and the micro projection module 7 is in an operation state.

Alternatively, a first trigger component 61 for triggering the camera component 6 is disposed at a position where the first body 1 and the second body 2 are coupled to each other.

Alternatively, the first trigger component 61 is disposed at at least one of the first coupling part 81 and the second coupling part 82.

Alternatively, if the first coupling part is a slot and the second coupling part is a buckle, or if the first coupling part is the buckle and the second coupling part is the slot, the first trigger component is disposed at an end portion of the buckle, or the first trigger component is disposed at a bottom portion of the slot.

Taking that the first trigger component 81 is disposed at the end portion of the buckle disposed at the second body 2 as an example, when the intercoupled first body 1 and second body 2 are separated from each other, the buckle is disengaged from the first slot, and the first trigger component 61 is also disengaged from the slot. In this case, the first trigger component 61 is triggered to turn on the camera component 6, enabling the camera component 6 to be in an operation state.

Or, when the first body 1 and the second body 2 in a separated state are coupled to each other, the buckle is inserted into the slot, and the first trigger component 61 is also inserted into the slot. In this case, the first trigger component 61 is triggered to turn off the camera component 6, enabling the camera component 6 to be in a standby state.

Alternatively, the first trigger component 61 is a mechanical button or a light sensor.

Alternatively, a second trigger component 71 for triggering the micro projection module 7 is disposed at a position where the first body 1 and the third body 3 are coupled to each other.

Alternatively, the second trigger component 71 is disposed at at least one of the third coupling part 91 and the forth coupling part 92.

Alternatively, if the third coupling part 91 is a slot and the forth coupling part 92 is a buckle, or if the third coupling part 91 is the buckle and the forth coupling part 92 is the slot, the second trigger component 71 is disposed at an end portion of the buckle, or the second trigger component 71 is disposed at a bottom portion of the slot.

Taking that the second trigger component 71 is disposed at the end portion of the buckle disposed at the third body 3 as an example, when the intercoupled first body 1 and third body 3 are separated from each other, the buckle is disengaged from the slot, and the second trigger component 71 is also disengaged from the slot. In this case, the second trigger component 71 is triggered to turn on the micro projection module 7, enabling the camera component 7 to be in an operation state.

Or, when the first body 1 and the third body 3 in a separated state are coupled to each other, the buckle is inserted into the second slot, and the second trigger component 71 is also inserted into the slot. In this case, the second trigger component 71 is triggered to turn off the camera component 7, enabling the camera component 7 to be in a standby state.

Alternatively, the second trigger component 71 is a mechanical button or a light sensor.

In the illustrated embodiments, the first trigger component 61 and the second trigger component 71 are disposed at a position where the first body 1 is coupled to the second body 2 and a position where the first body 1 is coupled to the third body 3, respectively, which omits operations of turning on and off the camera component 6 and the micro projection module 7, enabling the camera component 6 and the micro projection module 7 to be started more quickly.

Alternatively, a screen support 5 for supporting the flexible screen 4 is disposed outside of the flexible screen 4. The flexible screen 4 is disposed inside of a frame of the screen support 5, and outside of the frame of the screen support 5 is coupled to the first body 1, the second body 2 and the third body 3.

Alternatively, a first end 51 of the screen support 5 is coupled to and slidable relative to the second body 2, and a second end 52 of the screen support 5 is coupled to and slidable relative to the third body 3. The first end 51 of the screen support 5 is opposite to the second end of the screen support.

Alternatively, the screen support 5 is made of a flexible material which can be bent repeatedly.

Terms "first", "second", "third", "fourth" and "fifth" in the disclosure application are merely for distinguishing objects in description, without representing any special meaning.

It should be noted that the above-mentioned implementation manners are only optimal embodiments and applied technical principles. Any change or substitution that is readily conceived for any skilled one who is familiar with this art within the technical scope disclosed by the present disclosure shall fall into the protection scope of the disclosure.

What is claimed is:

1. A mobile terminal, comprising:
    a first body comprising a first end, a second end opposite to the first end, and a first surface;
    a second body disposed at the first end of the first body, and comprising a second surface;
    a third body disposed at the second end of the first body and comprising a third surface; and
    a flexible screen coupled to the first surface, the second face and the third surface and comprising a first end and a second end opposite to the first end thereof, wherein the first end of the flexible screen is disposed on the second surface and movable relative to the second surface, and the second end of the flexible screen is disposed on the third surface and movable relative to the third surface;
    wherein the second body is selectively coupled to or separated from the first end of the first body, and the third body is selectively coupled to or separated from the second end of the first body;
    wherein a first coupling part is disposed at the first end of the first body and a second coupling part is disposed at the second body, wherein the first coupling part and the second coupling part mate with each other and are selectively coupled to or separated from each other; and
    wherein a camera component is mounted to the second body and a first trigger component for triggering the camera component is disposed at at least one of the first coupling part and the second coupling part.

2. The mobile terminal of claim 1, wherein a screen support for supporting the flexible screen is disposed outside the flexible screen, and comprises a first end and a second end opposite to the first end thereof,
    wherein the first end of the screen support is coupled to and slidable relative to the second surface, and the second end of the screen support is coupled to and slidable relative to the third surface.

3. The mobile terminal of claim 1, wherein the mobile terminal further comprises:
    a camera component mounted to the second body; and
    a micro projection module mounted to the third body.

4. The mobile terminal of claim 3, wherein the camera component is mounted to at least one of the second surface, a fourth surface of the second body opposite to the second surface and a first frame disposed between the second surface and the fourth surface.

5. The mobile terminal of claim 3, wherein the micro projection module is mounted to at least one of the third surface, a fifth surface of the third body opposite to the third surface and a second frame disposed between the third surface and the fifth surface.

6. A mobile terminal, comprising:
    a first body comprising a first end, a second end opposite to the first end, and a first surface;
    a second body disposed at the first end of the first body, and comprising a second surface;

a third body disposed at the second end of the first body and comprising a third surface; and a flexible screen coupled to the first surface, the second face and the third surface and comprising a first end and a second end opposite to the first end thereof, wherein the first end of the flexible screen is disposed on the second surface and movable relative to the second surface, and the second end of the flexible screen is disposed on the third surface and movable relative to the third surface;

wherein the second body is selectively coupled to or separated from the first end of the first body, and the third body is selectively coupled to or separated from the second end of the first body;

wherein a third coupling part is disposed at the second end of the first body, and a fourth coupling part is disposed at the third body, wherein the third coupling part and the fourth coupling part mate with each other and are selectively coupled to or separated from each other; and wherein a micro projection module is mounted to the third body and a second trigger component for triggering the micro projection module is disposed at at least one of the third coupling part and the fourth coupling part.

7. A mobile terminal, comprising:

a first body comprising a first end and a second end opposite to the first end;

a second body disposed at the first end of the first body and rotatable relative to the first body;

a third body disposed at the second end of the first body and rotatable relative to the first body; and a flexible screen supported by the first body, the second body and the third body; wherein the flexible screen is coupled to a first surface of the first body, a second face of the second body and a third surface of the third body and comprises a first end and a second end; wherein the first end of the flexible screen is disposed on the second surface and movable relative to the second surface, and the second end of the flexible screen is disposed on the third surface and movable relative to the third surface, and wherein, by rotating at least one of the second body and the third body relative to the first body, the flexible screen mobile terminal is transformational between (i) a first configuration, in which the first body, the second body and the third body are in alignment with each other; and (ii) a second configuration, in which at least one of the second body and the third body is angled relative to the first body or located at different sides of the first body;

wherein the second body is selectively coupled to or separated from the first end of the first body, and the third body is selectively coupled to or separated from the second end of the first body;

wherein a first coupling part is disposed at the first end of the first body and a second coupling part is disposed at the second body, wherein the first coupling part and the second coupling part mate with each other and are selectively coupled to or separated from each other;

wherein a camera component is mounted to the second body and a first trigger component for triggering the camera component is disposed at at least one of the first coupling part and the second coupling part.

8. The mobile terminal of claim 7, wherein the mobile terminal further comprises:

a camera component mounted to the second body; and a micro projection module mounted to the third body.

9. The mobile terminal of claim 8, wherein the camera component is mounted to at least one of the second surface, a fourth surface of the second body opposite to the second surface and a first frame disposed between the second surface and the fourth surface.

10. The mobile terminal of claim 8, wherein the micro projection module is mounted to at least one of the third surface, a fifth surface of the third body opposite to the third surface and a second frame disposed between the third surface and the fifth surface.

11. A mobile terminal, comprising:

a first body comprising a first end and a second end opposite to the first end;

a second body disposed at the first end of the first body and rotatable relative to the first body;

a third body disposed at the second end of the first body and rotatable relative to the first body; and a flexible screen supported by the first body, the second body and the third body; wherein the flexible screen is coupled to a first surface of the first body, a second face of the second body and a third surface of the third body and comprises a first end and a second end; wherein the first end of the flexible screen is disposed on the second surface and movable relative to the second surface, and the second end of the flexible screen is disposed on the third surface and movable relative to the third surface, and wherein, by rotating at least one of the second body and the third body relative to the first body, the flexible screen mobile terminal is transformational between (i) a first configuration, in which the first body, the second body and the third body are in alignment with each other; and (ii) a second configuration, in which at least one of the second body and the third body is angled relative to the first body or located at different sides of the first body;

wherein the second body is selectively coupled to or separated from the first end of the first body, and the third body is selectively coupled to or separated from the second end of the first body;

wherein a third coupling part is disposed at the second end of the first body, and a fourth coupling part is disposed at the third body, wherein the third coupling part and the fourth coupling part mate with each other and are selectively coupled to or separated from each other;

wherein a micro projection module is mounted to the third body and a second trigger component for triggering the micro projection module is disposed at at least one of the third coupling part and the fourth coupling part.

* * * * *